(12) United States Patent
Miwa et al.

(10) Patent No.: US 9,039,167 B2
(45) Date of Patent: May 26, 2015

(54) GLASSES

(75) Inventors: Yoshihiro Miwa, Nagoya (JP); Tadashi Kita, Osaka (JP)

(73) Assignee: KOWA CO., LTD., Aichi (JP)

( * ) Notice: Subject to any disclaimer, the term of this patent is extended or adjusted under 35 U.S.C. 154(b) by 0 days.

(21) Appl. No.: 13/513,353

(22) PCT Filed: Nov. 22, 2010

(86) PCT No.: PCT/JP2010/070772
§ 371 (c)(1),
(2), (4) Date: Jun. 1, 2012

(87) PCT Pub. No.: WO2011/068051
PCT Pub. Date: Jun. 9, 2011

(65) Prior Publication Data
US 2012/0236249 A1    Sep. 20, 2012

(30) Foreign Application Priority Data

Dec. 3, 2009  (JP) ................................. 2009-275187
Dec. 3, 2009  (JP) ................................. 2009-275188

(51) Int. Cl.
*G02C 7/10* (2006.01)
*G02C 7/16* (2006.01)
*G02C 11/08* (2006.01)

(52) U.S. Cl.
CPC . *G02C 7/16* (2013.01); *G02C 11/08* (2013.01)

(58) Field of Classification Search
CPC ........... G02C 7/16; G02C 11/08; G02C 5/008
USPC ............ 351/42–178; 2/15, 9, 10, 11, 12, 410, 2/426, 427, 431–447; 359/244, 581
See application file for complete search history.

(56) References Cited

U.S. PATENT DOCUMENTS

| | | | | |
|---|---|---|---|---|
| 4,868,930 A | * | 9/1989 | Blackstone | 2/439 |
| 5,000,558 A | * | 3/1991 | Blackstone | 351/41 |
| 5,016,292 A | * | 5/1991 | Rademacher | 2/431 |
| 5,033,128 A | * | 7/1991 | Torres | 2/427 |
| 5,146,623 A | * | 9/1992 | Paysan et al. | 2/12 |

(Continued)

FOREIGN PATENT DOCUMENTS

| | | |
|---|---|---|
| JP | 61-206918 U | 12/1986 |
| JP | 3122818 U | 12/1991 |

(Continued)

OTHER PUBLICATIONS

Written Opinion of the International Searching Authority for PCT/JP2010/070772, Jan. 18, 2011.

(Continued)

*Primary Examiner* — Suchin Parihar
*Assistant Examiner* — Collin X Beatty
(74) *Attorney, Agent, or Firm* — Bacon & Thomas, PLLC

(57) ABSTRACT

The present invention has a technical object to provide glasses which prevent invasion of pollen, can be continuously worn without any discomfort in wearing, and can effectively block ultraviolet ray. The present invention achieves the technical object by glasses including inwardly projecting visors in rims and end pieces of a frame, and glasses in which lenses, a frame, and inwardly projecting visors formed in the frame are formed of synthetic resin containing an ultraviolet absorbing agent or an ultraviolet scattering agent.

5 Claims, 2 Drawing Sheets

(56) References Cited

U.S. PATENT DOCUMENTS

| | | | | |
|---|---|---|---|---|
| 5,245,709 A * | 9/1993 | Shipcott | | 2/425 |
| 5,608,469 A * | 3/1997 | Boll e | | 351/44 |
| 5,959,761 A * | 9/1999 | Perrott et al. | | 359/244 |
| 6,036,315 A * | 3/2000 | Copeland | | 351/159.63 |
| 6,082,857 A * | 7/2000 | Lockhart | | 351/178 |
| 6,196,678 B1 * | 3/2001 | Chapin, III | | 351/44 |
| 6,450,639 B1 * | 9/2002 | Abraham | | 351/62 |
| 6,871,954 B2 * | 3/2005 | Copeland | | 351/159.6 |
| 7,083,276 B2 * | 8/2006 | Olney | | 351/62 |
| 7,114,807 B2 * | 10/2006 | Tagawa | | 351/62 |
| 7,255,435 B2 * | 8/2007 | Pratt | | 351/44 |
| 7,665,841 B2 * | 2/2010 | Resler et al. | | 351/156 |
| 7,862,165 B2 * | 1/2011 | Hobbs | | 351/44 |
| 8,042,936 B2 * | 10/2011 | Hobbs | | 351/44 |
| 8,081,262 B1 * | 12/2011 | Perez | | 349/14 |
| 8,398,234 B2 * | 3/2013 | Wang et al. | | 351/62 |
| 2003/0030771 A1 * | 2/2003 | Hursey, Jr. | | 351/123 |
| 2005/0225715 A1 * | 10/2005 | Kopfer | | 351/62 |
| 2006/0055878 A1 * | 3/2006 | Yee | | 351/159 |
| 2006/0143766 A1 * | 7/2006 | Ramsey | | 2/15 |
| 2006/0274257 A1 * | 12/2006 | Tagawa | | 351/62 |
| 2007/0252943 A1 * | 11/2007 | Welchel et al. | | 351/62 |
| 2008/0158503 A1 * | 7/2008 | Estrem | | 351/62 |
| 2009/0165184 A1 * | 7/2009 | Hogen | | 2/15 |

FOREIGN PATENT DOCUMENTS

| | | |
|---|---|---|
| JP | H06-118352 A | 4/1994 |
| JP | 3006838 U | 7/1994 |
| JP | H06-55731 U | 8/1994 |
| JP | H07-80957 A | 3/1995 |
| JP | 3028227 U | 6/1996 |
| JP | H08-294547 A | 11/1996 |
| JP | 10062725 A | 3/1998 |
| JP | 10239642 A | 9/1998 |
| JP | 2001343618 A | 12/2001 |
| JP | 2002-250899 A | 9/2002 |
| JP | 2004-54068 A | 2/2004 |
| JP | 2004264777 A | 9/2004 |
| JP | 2004-287177 A | 10/2004 |
| JP | 2004325590 A | 11/2004 |
| JP | 2004341124 A | 12/2004 |
| JP | 2005128463 A | 5/2005 |
| JP | 3114164 U | 6/2005 |
| JP | 2005292750 A | 10/2005 |
| JP | 2006-79045 A | 3/2006 |
| JP | 2007093862 A | 4/2007 |
| JP | 2009057419 A | 3/2009 |
| JP | 3152412 U | 7/2009 |

OTHER PUBLICATIONS

International Search Report for PCT/JP2010/070772, Jan. 18, 2011.
Chinese Office Action dated Dec. 25, 2013 for related CN 201080054667, and English translation thereof.
Japanese Office Action dated Sep. 9, 2014, for JP 2011-544237, and English translation thereof.
Japanese Office Action dated Jun. 10, 2014 for JP 2011-544237, and English translation thereof.
Taiwanese Search Report dated Feb. 9, 2015, for TW 099141874, and English translation thereof.

* cited by examiner

GLASSES

FIELD OF THE INVENTION

The present invention relates to glasses, and more particularly to glasses suitable for hay fever sufferers, and further suitable for ultraviolet protection.

BACKGROUND OF THE INVENTION

Generally, in wearing glasses, a considerable space is formed between an upper part of the glasses and a face, and, unfortunately, pollen easily enters the eyes.

Thus, in recent years, so-called goggle-type glasses have been proposed in order to prevent invasion of pollen (for example, see Patent Document 1).

However, the goggle type glasses abut against a face around the eyes to fully cover the eyes, and thus lenses easily fog up. Also, even if an abutment portion of the glasses is formed of a soft material, a wearer may feel pressure or discomfort and even pain due to abutment, and actually, the glasses have not been suitable for continuous wearing.

Also, as glasses for ultraviolet protection, glasses with lenses containing an ultraviolet absorbing agent have been known (for example, see Patent Document 2).

However, in wearing conventional glasses, a considerable space is formed between an upper part of the glasses and a face, and ultraviolet rays from the glasses cannot be blocked. This has been one of the factors leading to occurrence of blotches around the eyes in future.

Prior Art Document

Patent Document

[Patent Document 1] JP-U-3-122818
[Patent Document 2] JP-A-2009-57419

SUMMARY OF THE INVENTION

Technical Problem

The present invention is achieved in view of conventional problems and circumstances as described above, and has an object to provide glasses suitable as glasses for hay fever sufferers, which can significantly prevent invasion of pollen, prevent lenses from fogging up, and can be continuously worn like normal glasses without any discomfort.

The present invention has another object to provide glasses which can also block ultraviolet rays from above the glasses in wearing.

Solution to Problem

The present inventor has made various studies to achieve the objects, and found that even if areas around the eyes are not fully sealed, providing visors projecting toward a face, that is, projecting inwardly in an upper part of a frame of glasses can prevent lenses from fogging up, does not adversely affect wearing comfort, and can significantly prevent invasion of pollen, to complete the present invention.

Specifically, to achieve the object, the present invention provides glasses including inwardly projecting hoods in rims and end pieces of a frame, or also in a part of temples of the frame.

The present inventor has found that forming inwardly projecting visors in a frame, and forming lenses and also the frame and the inwardly projecting visors of synthetic resin containing an ultraviolet absorbing agent or an ultraviolet scattering agent can significantly prevent invasion of pollen, and also block ultraviolet rays from above glasses in wearing, to complete the present invention.

Specifically, to achieve the object, the present invention provides glasses in which lenses, a frame, and inwardly projecting visors formed in the frame are formed of synthetic resin containing an ultraviolet absorbing agent or an ultraviolet scattering agent.

Effects of the Invention

The glasses according to the present invention include the inwardly projecting visors in the rims and the end pieces of the frame, or also in a part of the temples of the frame. Thus, in wearing the glasses, little gap is formed between an upper part of the glasses and a face, thereby significantly preventing invasion of pollen.

Also, since areas around the eyes are not fully covered by abutment, the lenses do not fog up in wearing, and the glasses can be continuously worn without any discomfort. Thus, the glasses are particularly suitable as glasses for hay fever sufferers.

Further, particularly, if the glasses according to the present invention are carried out with the lenses and also the frame and the inwardly projecting visors formed in the frame containing an ultraviolet absorbing agent or an ultraviolet scattering agent, ultraviolet rays from above the glasses in wearing can be blocked, thereby preventing occurrence of blotches around the eyes.

DESCRIPTION OF EMBODIMENT

An embodiment of the present invention will be described with reference to the drawings.

Figure 1:
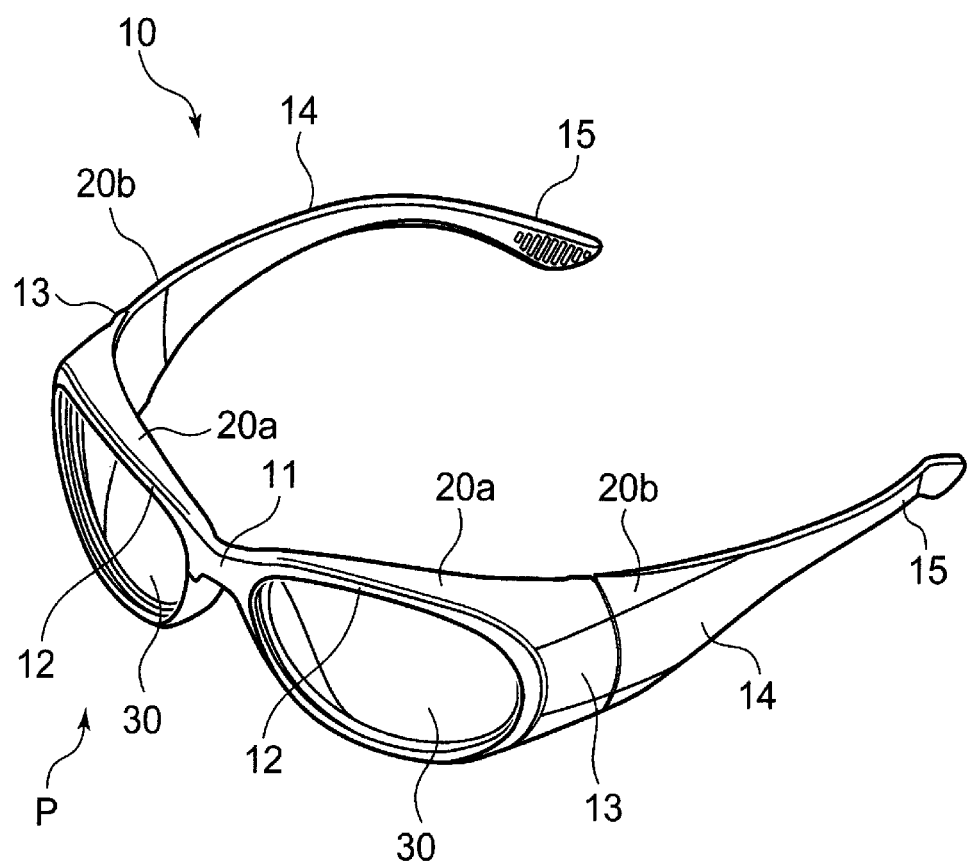
FIG. 1 is a schematic perspective illustrative view of glasses according to the present invention.
Figure 2:
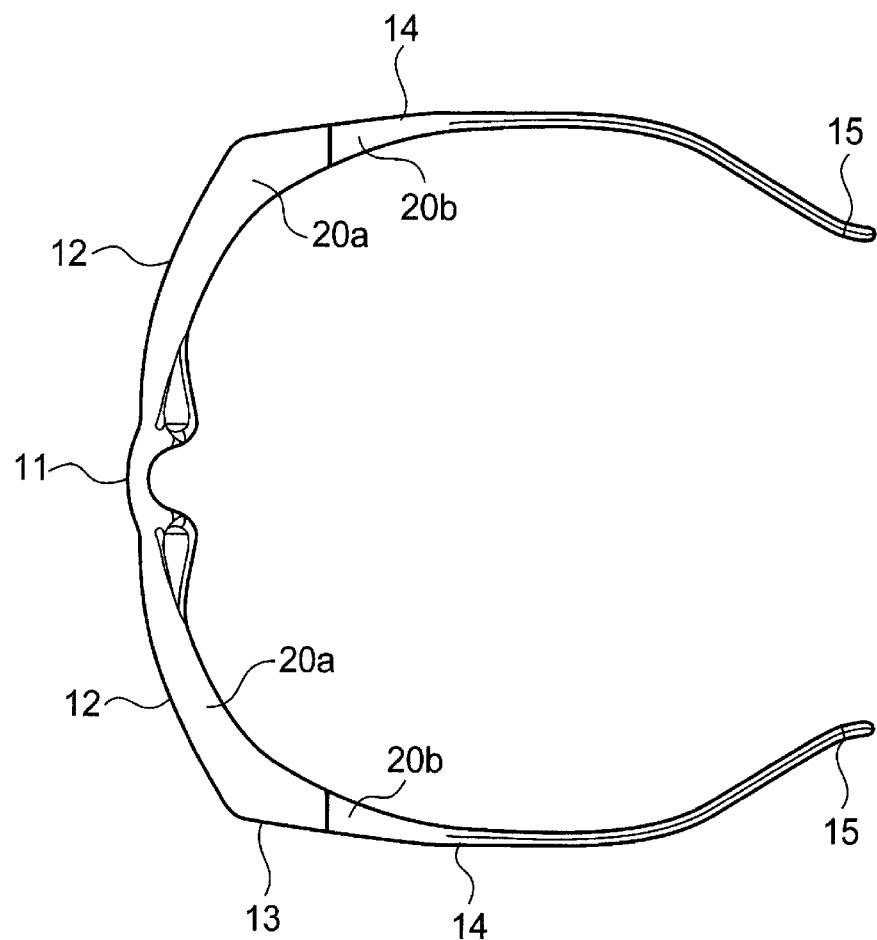
FIG. 2 is a schematic plan illustrative view of the glasses according to the present invention.
Figure 3:
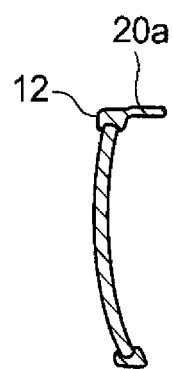
FIG. 3 is a vertical sectional illustrative view of a center of a lens of the glasses according to the present invention.

In FIGS. 1 to 3, reference character P denotes glasses according to the present invention, which includes a frame 10 and lenses 30. The frame 10 includes a bridge 11, rims 12, end pieces 13, temples 14, and ear pads 15, and inwardly projecting visors 20*a* are formed in the rims 12 and the end pieces 13. The inwardly projecting visors may be formed only in the rims 12 and the end pieces 13, and it is advantageous for preventing invasion of pollen that the inwardly projecting visors 20*b* are further formed in a part of the temples 14, particularly, a part closer to the end pieces 13 side.

The frame 10, the inwardly projecting visors 20*a*, 20*b*, and the lenses 30 are all formed of synthetic resin.

The synthetic resin is not particularly limited, but for example, polycarbonate resin is suitable.

Further, according to purposes, the frame 10, the inwardly projecting visors 20*a*, 20*b*, and the lenses 30 may be all formed of synthetic resin containing an ultraviolet absorbing agent or an ultraviolet scattering agent.

The ultraviolet absorbing agent is not particularly limited, but may include, for example, an organic ultraviolet absorbing agent such as benzophenone-type, benzotriazole-type, triazine-type, and salicylate-type ultraviolet absorbing agents, and an inorganic ultraviolet absorbing agent such as iron oxide. The ultraviolet scattering agent may include, for example, titanium oxide or zinc oxide.

The inwardly projecting visors 20a, 20b desirably have projecting lengths such that projecting ends of the inwardly projecting visors 20a, 20b do not abut against a face in wearing the glasses for preventing discomfort due to abutment. Specifically, the lengths are preferably selected from a range of 3 to 15 mm, particularly, 5 to 10 mm according to shapes of the face and sides of a head of a wearer. Thicknesses of the inwardly projecting visors 20a, 20b are not particularly limited, and may be usually sufficient at about 1.5 to 3 mm.

The inwardly projecting visors 20a, 20b may generally have the same projecting length. However, it is advantageous that the inwardly projecting visors 20a, 20b have gradually longer lengths in the rims 12 from the bridge 11 side toward the end pieces 13 side and have the longest lengths in the end pieces 13, while the inwardly projecting visors 20a, 20b have gradually shorter lengths in the temples 14 from the end pieces 13 side toward the ear pads 15 side, and the entire inwardly projecting visors 20a, 20b are formed to match the shapes of the face and the sides of the head of the wearer, because a gap formed between an upper part of the frame 10 and the face in wearing can be minimized to more effectively prevent invasion of pollen.

In this case, the projecting lengths of the inwardly projecting visors 20a, 20b may be linearly changed. However, the projecting lengths are desirably changed in a curve so that the projecting ends of the inwardly projecting visors 20a, 20b form arcuate or elliptic curves having a radius of 50 to 85 mm, because glasses can be provided which more perfectly match the shapes of the face and the sides of the head in wearing, and has stylish and fashionable appearance.

The inwardly projecting visors 20a, 20b may be molded as separate members, and mounted to and integrated with the rims 12, the end pieces 13, and the temples 14. However, it is desirable that the inwardly projecting visors 20a are integrally molded with the rims 12 and the end pieces 13, and the inwardly projecting visors 20b are integrally molded with the temples 14, because invasion of pollen can be more effectively prevented, and high production efficiency can be obtained.

Similarly, the lenses 30 are desirably integrally molded with the bridge 11, the rims 12, and the end pieces 13 for blocking ultraviolet, preventing invasion of pollen, and providing high production efficiency.

REFERENCE SIGNS LIST

P glasses
10 frame
11 bridge
12 rim
13 end piece
14 temple
15 ear pad
20a inwardly projecting visor
20b inwardly projecting visor
30 lens

The invention claimed is:

1. Glasses comprising:
a frame and lenses,
said frame comprising a bridge, rims, end pieces, ear pads, temples, and inwardly projecting visors,
wherein the inwardly projecting visors are integrally molded with the rims and the end pieces of the frame and are also integrally molded with a part of the temples of the frame,
wherein the projecting lengths of the inwardly projecting visors are gradually longer in the rims and the end pieces from a bridge side toward a temple side of the frame, while the projecting lengths of the inwardly projecting visors are gradually shorter in the temples from an end pieces side toward an ear pads side, and
wherein the lenses, the frame, and the inwardly projecting visors formed in the frame are formed of synthetic resin containing an ultraviolet absorbing agent or an ultraviolet scattering agent.

2. The glasses according to claim 1, wherein the inwardly projecting visors have projecting lengths of 3 to 15 mm.

3. The glasses according to claim 1, wherein projecting ends of the inwardly projecting visors form arcuate or elliptic curves having a radius of 50 to 85 mm.

4. Glasses comprising:
a frame and lenses,
said frame comprising a bridge, rims, end pieces, ear pads, temples, and inwardly projecting visors,
wherein the inwardly projecting visors are integrally molded with the rims and the end pieces of the frame,
wherein the lenses are integrally molded with the bridge, the rims, and the end pieces of the frame,
wherein projecting ends of the inwardly projecting visors form arcuate or elliptic curves having a radius of 50 to 85 mm, and
wherein the lenses, the frame, and the inwardly projecting visors formed in the frame are formed of synthetic resin containing an ultraviolet absorbing agent or an ultraviolet scattering agent.

5. The glasses according to claim 4, wherein the inwardly projecting visors have projecting lengths of 3 to 15 mm.

* * * * *